(No Model.)  3 Sheets—Sheet 1.
J. H. IRWIN.
Lamp Stove.
No. 238,395. Patented March 1, 1881.
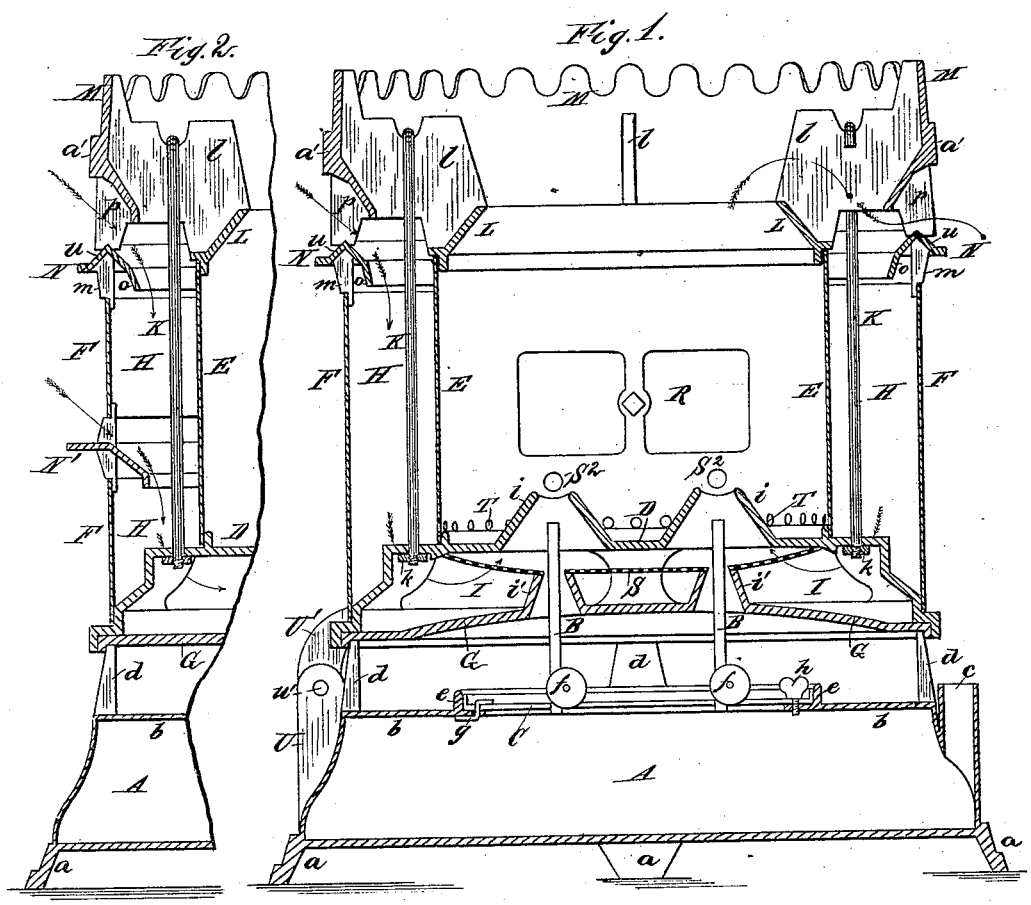
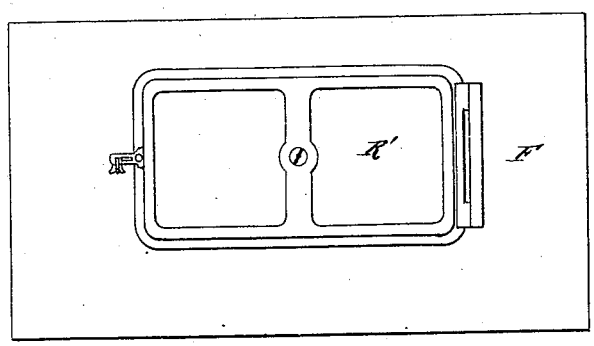
Attest:
Charles R. Searle
Arthur M. Pierce
Inventor:
John H. Irwin,
By Worth Osgood,
Attorney.

(No Model.) 3 Sheets—Sheet 2.
J. H. IRWIN.
Lamp Stove.
No. 238,395. Patented March 1, 1881.
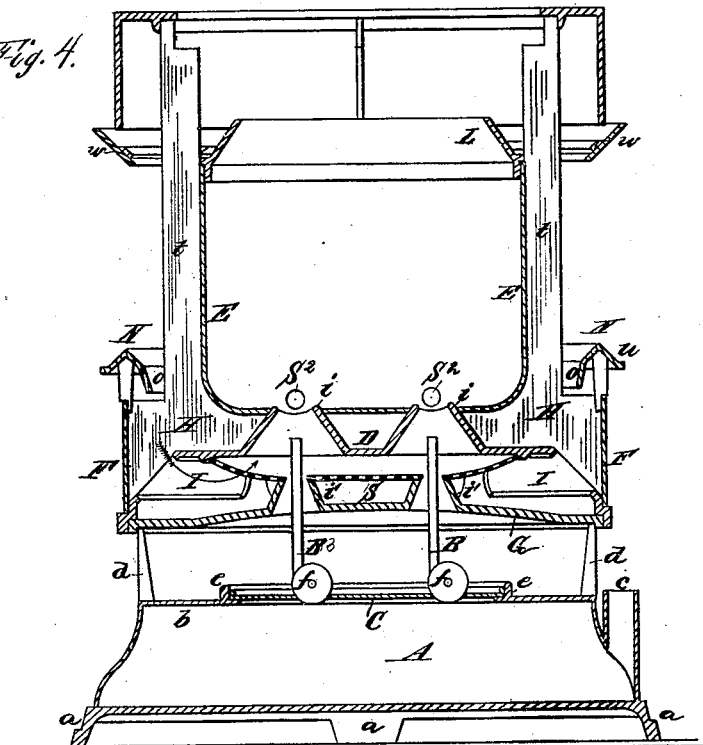
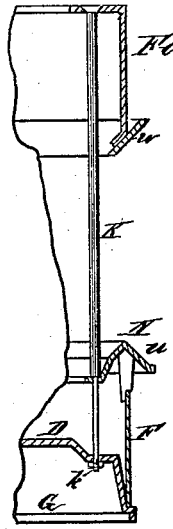
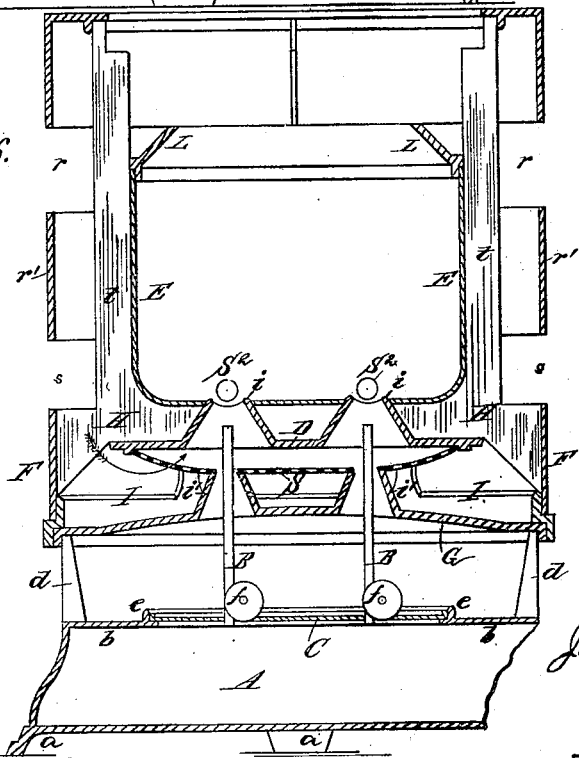
Attest:
Charles R. Searle.
Arthur M. Pierce.
John H. Irwin,
Inventor:
By Worth Osgood,
Attorney.

(No Model.)  3 Sheets—Sheet 3.

J. H. IRWIN.
Lamp Stove.

No. 238,395.  Patented March 1, 1881.

Attest:
Charles R. Searle.
Arthur M. Pierce.

John H. Irwin,
Inventor:
By Worth Osgood,
Attorney.

UNITED STATES PATENT OFFICE.

JOHN H. IRWIN, OF MORTON, PENNSYLVANIA.

LAMP-STOVE.

SPECIFICATION forming part of Letters Patent No. 238,395, dated March 1, 1881.

Application filed April 15, 1880. (No model.)

*To all whom it may concern:*

Be it known that I, JOHN H. IRWIN, of Morton, in county of Delaware and State of Pennsylvania, have made certain new and useful Improvements in Lamp-Stoves, of which the following is a full, clear, and exact description, reference being had to the accompanying drawings, and to the letters of reference marked thereon, the same not having been, to my knowledge, heretofore patented in any foreign country.

My present invention has relation to that type of lamp-stoves wherein the air for feeding the flame is carried down to the burners from a point above them, and controlled in direction, for purposes of preventing smoking and increasing combustion corresponding to the increase of pressure produced by the ingoing fresh-air currents or exhausted products of combustion, as set forth in previous applications for patents made by me.

The objects of my present invention are to combine with the stove-burners a suitable and effective annular conduit for the feed-air, together with properly-arranged air deflecting or directing surfaces, the said conduit discharging into a chamber leading to the under sides of the burner-cones, and to simplify and improve the general arrangement of the stove, rendering it simple and easy to make and operate, safe from overheating, and sensitive in respect to the control and proper direction of any possible air-currents which may strike the structure when exposed to wind or other disturbances.

To accomplish these objects the invention involves certain novel and useful arrangements or combinations of parts, and certain peculiarities or details of construction, all of which will be hereinafter first fully described, and then pointed out in the claims.

Figure 7:
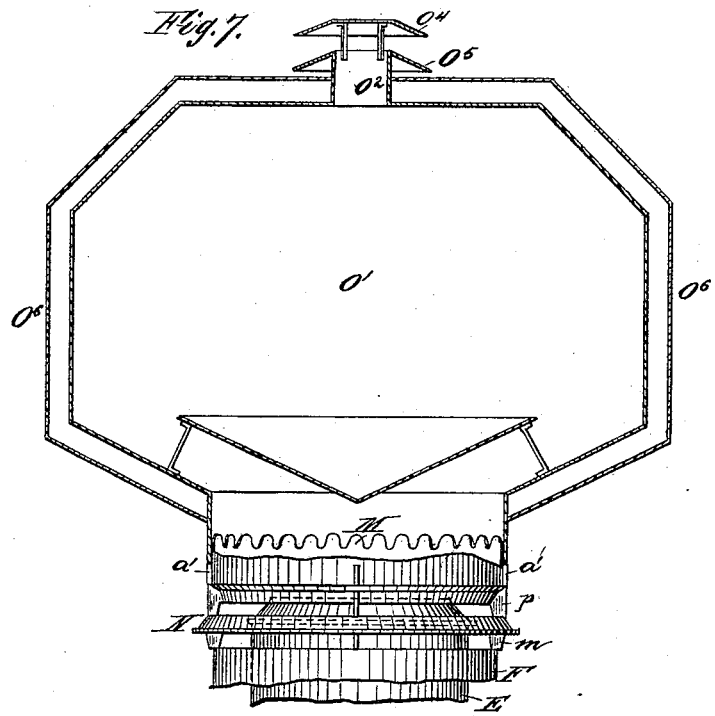
Figure 8:
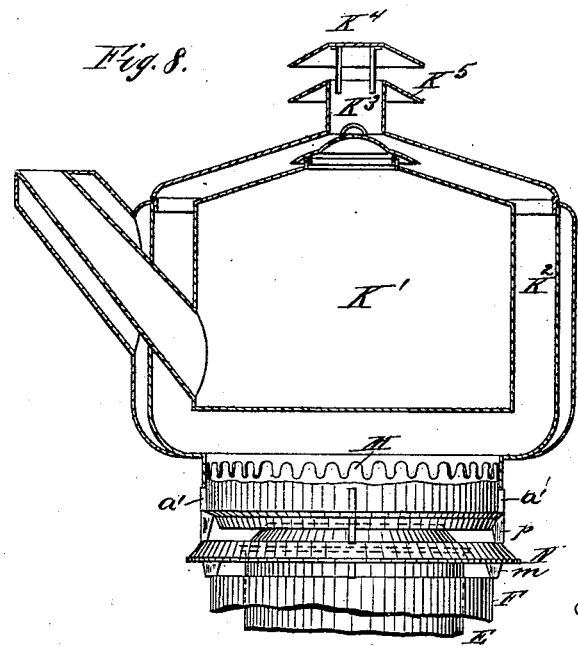

In the drawings, Figure 1 is a sectional elevation of a stove embodying my improvements, the view being upon a plane passing through the axis of the stove. Fig. 2 is a similar view of a fragment of the stove shown in Fig. 1, upon a plane passing near to and parallel with one of the assembling-bolts, and showing an intermediate or second injector. Fig. 3 is an elevation of the outer jacket, showing location and arrangement of an illuminating-door therein. Fig. 4 is a sectional elevation of a stove constructed in accordance with my improvements, and showing the annular air-injector located at a considerable distance below the top of the stove; and Fig. 5 is a sectional view of a fragment of the stove shown in Fig. 4, upon a plane passing near and parallel with one of the assembling-bolts. Fig. 6 is a sectional elevation of a stove constructed in accordance with my improvements, showing the annular air-conduit as provided with vertical division-strips serving to direct and control the incoming and outgoing currents, and replacing the exterior annular deflecting surfaces. Fig. 7 is a sectional view of an oven located over my improved stove, (the upper part of the stove being shown in elevation,) said oven being constructed and arranged to preserve, when in place, the proper direction of currents through the whole structure; and Fig. 8 is a similar view of a kettle or cooking utensil shown as located upon the stove and adapted to operate in connection therewith in a manner, when in place, to preserve all the advantages of the general structure.

Like letters of reference wherever they occur indicate corresponding parts in all the figures.

A is the oil-reservoir, preferably of cast metal, having suitable feet $a$ $a$, top plate, $b$, filler-orifice $c$, and standards $d$ $d$ for the support of the superstructure. The oil-pot thus made forms the base of the stove, and for economy in construction it is preferably cast in one piece, with the adjuncts above named, (the bottom plate being of a separate piece,) a central orifice being left in the top plate for the passage of the wicks, said orifice being surrounded by a narrow upright flange, $e$, a little removed from the edge thereof, whereby is formed a convenient seat for the wick-tube plate. The filler orifice is intended to be covered by any suitable form of cap of the safety or other patterns, or to be closed by a cork, &c., in the usual way. The casting of all these parts in one piece renders the base firm and durable, besides reducing the cost of construction; but whether made in one piece or in separate pieces, the whole should be galvanized or otherwise protected from corrosion after the well-known customs.

The bottom of the reservoir may be of cast or sheet metal, and if of a separate piece from the walls should be properly secured in place by soldering.

One or more wick-tubes, B B, are secured in a plate, C, and provided with the usual wick-raising ratchets and projecting shafts, as indicated at $f$. The plate C is made to rest upon that portion of cover $b$ which projects within the rim or flange $e$, and should fit snugly into the recess thus provided for it. This plate C, with its attached wick-tube or wick-tubes B, is made detachable from the oil-reservoir, and is secured thereon against accidental displacement by means of the hook $g$ on one side, which hook passes beneath the cover $b$ and the thumb-screw $h$ on the opposite side, said thumb-screw passing freely through an orifice in plate C and engaging with the screw-threaded opening prepared for it in the top plate, $b$. When the superstructure is thrown back or otherwise removed, it is plain that in order to detach the wick-tube plate it is only necessary to withdraw screw $h$ and lift the plate out of its place. The burner-plate D, which carries the deflecting-cones $i$ $i$, (one or more, according to the wick-tubes,) arranged to deflect the feed-air at the proper point against the flame, is made to support the chimney E, and the outer surrounding jacket, F, which forms, with said chimney, an annular air-conducting space communicating with the channel or chamber beneath the burner-plate D. Beneath the burner-plate D is a second plate, G, made to join the former at the perimeter, and the two together forming the channel or chamber through which the feed-air passes from the annular conduit H on its way to the under side of the cone or cones $i$. This plate G is perforated for the passage of the wick-tubes, preferably provided with short cones $i'$ $i'$, rising slightly above its top, and it is made to rest upon the standards $d$ $d$ and to maintain the weight of the parts above it.

For the passage of air from the annular conduit H, formed by chimney E and jacket F, to the chamber or channel I, between plates D and G, the burner-plate D is provided with suitable openings in that part which extends beyond chimney E, or in the same part the burner-plate is cut away except as to such portions as are required to form the seat for jacket F and the bearings for nuts $k$ $k$ on the connecting rods or bolts K K.

Upon the top of chimney E is mounted an annular and inwardly-inclined flange, L, and this flange is connected with the exterior rim, M, (the top rim of the stove,) by the vertical radial strips $l$ $l$—three, four, or more in number. These radial strips $l$ $l$ form the supports for the kettle or other cooking utensil when the latter is of smaller diameter than the rim M; but in case the cooking utensil be of larger diameter than said rim, it may rest directly on the top thereof; or, as in the case of an oven or kettle specially prepared to operate in conjunction with the stove, as in Figs. 7 and 8, the lower rim of the oven or kettle may be made to rest upon the studs $a'$ $a'$, (shown in Figs. 1, 7, and 8,) and fitting closely around the top rim of the stove.

As shown in section at Figs. 1 and 2, the ring M is provided with an inwardly-inclined flange at bottom, which flange will direct impinging air-currents downwardly and past the open mouth of the chimney in such manner as to cause an ejection of the contents of the chimney after a well-known law of pneumatics. In Figs. 4 and 5 this flange is replaced by a detached ring, $w$, as will be explained hereinafter.

At N, in Fig. 1, is an annular ring located beneath the top M and supported upon the jacket F by studs $m$ $m$ at suitable intervals. This ring N is composed of deflecting-surfaces, the one, $u$, extending outside of jacket F, and and the other, $o$, projecting inside of said jacket, both being inclined downwardly; and upon the top of this ring N rest the studs $p$, which are united with ring M.

The burner-plate D and all the parts of the stove above it are locked together by the bolts K, as plainly shown in Figs. 1, 2, and 5. The stove so organized, in a quiet atmosphere, draws its supply of feed-air down through the annular conduit H. Any disturbing air-currents which strike the injector-ring N upon its under side will be deflected down into the conduit H, and thus made to increase the combustion rather than retard it, as would occur if air should be exhausted from this conduit. Any downwardly-inclined currents of air which pass between the injector-ring N and top ring, M, will in like manner be directed downward into conduit H. Such currents as can blow directly through the opening beneath N and M will impinge upon the flange L and cause an exhaustion from the chimney, the current in the chimney being much more highly heated than that in the conduit. Thus it will be seen that any disturbing action tends to keep the feeding-current always in the same direction—that is, upwardly through the burner-cones $i$—and thus prevents imperfect combustion and smoking or extinguishment of the flame by exhaustion from air-conduit H.

Instead of employing the annular-shaped air-deflecting surfaces in and around the mouth of the annular air-conduit H, the jacket F may be perforated or cut away, as at $r$ $s$, Fig. 6, and vertical strips, as at $t$ $t$, be placed against the chimney. These strips afford rest at top for the cooking-utensil, and they operate to obstruct any incoming air-currents, preventing them from making the circuit of the chimney, and causing them to pass through the channels formed, those which enter the lower opening going for the most part to feed the flame, and those which enter the upper opening finding their way across the top of the chimney and out on the other side of the structure with the gases and products of combustion. In this respect, when the stove is organized as in Fig. 6, the deflecting-strips t practically perform the same offices with respect to the impinging air-currents as the annular injector-ring above explained.

The ring r', between openings r s, may be inclined at bottom toward the chimney, so as to more readily turn the side currents down into the annular air-feeding conduit.

Instead of locating the annular injector-ring immediately beneath the top ring, M, the jacket may be cut short and ring N located as in Figs. 4 and 5, together with the vertical strips t located and arranged about the chimney as in Fig. 6. In this form, Figs. 4 and 5, the top ring is provided with an ejector-plate, w, so arranged as to deflect impinging air-currents downwardly and in such manner as to cause an ejection from the top of the chimney. Other arrangements and combinations of these injector and ejector plates or surfaces might readily be made, the illustrations serving to indicate that there is an ejector arranged in connection with the discharge end of the chimney, and an injector in connection with the annular feed air-conduit.

As in Fig. 2, a second injector plate or ring, N', may be located between the injector shown in Fig. 2 and the bottom of the jacket. In a similar way any number of injectors may be applied to the annular conduit.

It will be noticed that the annular injector-surfaces shown in Figs. 1 and 2 are arranged to deflect upwardly-moving exterior air-currents into conduit H by means of a horizontal or downwardly-inclined flange projecting beyond jacket F.

The ejectors, in connection with the outlet for products of combustion, are so arranged as to prevent any cold-air currents from blowing directly across the passage beneath the bottom of the heating-plate, or whatever utensil may be upon the stove, the effect of which would be to diminish the heating properties of the stove; but the limited number of currents from directions which would permit them to enter the space above the chimney and be deflected by the ejector-plate upon the end of the chimney in such manner as to cause an ejection therefrom, increase the combustion, and neutralize their cooling effect.

The bottom of the chimney may be made to reach only to the top of the burner-cones, as indicated at Figs. 4 and 6, being bent, as shown, for that purpose, and all the above-explained results will follow, the same as if the chimney were extended farther down.

At R is a window in the chimney, opposite to which is a similar window or door in the outer jacket, as at R', Fig. 3, if said jacket be otherwise imperforate in the region of such interior window. A perforated plate, S, surrounds the wick-tubes and extends up to the bottom plate of the chimney, serving to divide up and control the air-currents before they reach the flame.

It will be observed that there is a free open space above the oil-pot for the passage of air, keeping the oil-pot always cool.

For the further protection of the oil-pot against overheating, I galvanize or otherwise render the top of the burner-plate D a reflecting-surface, in order that it may not absorb heat and communicate the same to the parts below. This galvanizing or coating of the burner-plate also renders it more durable, inasmuch as it is exposed more or less to the corroding action produced by water or other matters falling upon it from the cooking-utensil above.

The bottom plate, G, through which the wick-tubes extend, is made to fit around them pretty closely, so as to obviate the danger of air passing through the before-mentioned free open space from exhausting air from the air channel or chamber I to any extent sufficient to interfere with the proper combustion, and at the same time there is space enough left to insure a little inflow of air around the tubes, so that when the stove is standing in a quiet atmosphere there will be a constant current over the top of the oil-fount. In the event of an exceedingly strong current being injected into the space below the burner-plate through the annular chamber or conduit, these limited openings around the wick-tubes will afford a convenient relief from the effects thereof, allowing a portion of such current to be forced out below; but in all cases these openings are much smaller than the slots in the burner-plate, so that the greater portion of any incoming volume of air will pass upwardly and through the slots in the plate.

At $S^2$ $S^2$ are lighting-apertures; and at T T, Fig. 1, are small openings into the chimney communicating with the annular conduit. Through these last-named openings a small quantity of air finds its way into the chimney outside of and independent of the burner-plate. These openings or perforations T T may be omitted, as indicated in Figs. 4 and 6, without seriously interfering with the operation of the stove.

When the stove is organized as in Figs. 4 and 5 the assembling-rods K are made to pass through the top plate, through the annular injector N, and through the burner-plate D, as plainly shown in Fig. 5, thus binding all the upper portions of the stove securely together.

Similarly in respect to the organization indicated in Fig. 6, the burner-plate, chimney, outer jacket, and top or rim are to be united by a coupling bolt or rod of any approved pattern; or, instead of the coupling-rods employed, as explained, the parts may be united by any equivalent mechanical means.

Upon the oil-pot or base of the stove is cast or otherwise affixed a lug, U, perforated for the reception of the hinged axis $u'$, and upon this are swung all the upper and connected parts of the stove, as plainly indicated at Fig. 1, the burner-plate being provided with a corresponding lug, U'. By thus hinging the burner-plate and the parts connected with it to the base of the stove, it is plain that in order to expose the wick-tubes for trimming the wicks, or regulating or lighting them, &c., it is only necessary to tip the top of the stove backward upon the hinge, leaving the wick-tubes free from all obstructions. Similar hinges may be employed upon the forms shown in Figs. 4 and 6, wherever the hinged connections are not especially indicated.

Reference to the drawings will show that the diameter of the annular air-channel is made considerably greater than the length of the chimney, or than the distance through which the fresh air is compelled to travel after entering the structure before reaching the flame; and it will also be observed that the jacket is well removed from the chimney. This construction affords an extended area or capacity for the fresh-air conduit, and consequently a large volume of air to feed the flame, which in passing down to the burners is not liable to become overheated by contact with the chimney. The overheating of the feed-air would tend to produce an upward current in the air-feeding channel, diminishing thereby the supply of air to support combustion, and preventing the successful practical operation of the stove. The proportions of the different parts indicated bring the kettle or cooking-vessel well down upon the flame, in a position best adapted to utilize the maximum effects of the heat generated within the chimney.

The oven O', Fig. 7, receives the products of combustion directly from the chimney, said oven being mounted directly over the upper rim of the stove, resting upon the studs $a'$ $a'$, or otherwise, as may be preferred. The products of combustion are made to completely fill the baking-chamber in consequence of the relative areas of inlet and outlet, the outlet $O^2$ being made much smaller than the inlet at bottom of the oven. When the oven is in place it forms a continuation of the channel which conducts the products of combustion to their final outlet, and in order to insure the proper working of the stove under all such circumstances, an ejector is located at the discharge end of outlet $O^2$. This ejector may be formed in the usual way of a cap-plate, $O^4$, and a deflecting-plate, $O^5$, or, however formed, it being an ejector, it should be so constructed as that any impinging or passing currents will cause an increased exhaustion from that portion of the conduit formed by the oven. Under this relative size of outlet and inlet for the oven there will be at all times some products of combustion escaping at the outlet provided for them in the stove proper.

To insure against too great radiation of heat, the oven O' may be surrounded, or partially surrounded, by a jacket, $O^6$, which, with the oven-walls, will form an inclosed dead-air space; or this outer jacket may be omitted, if desired.

The kettle K' shown in Fig. 8 is inclosed in a jacket, $k^2$, and between the kettle and jacket the products of combustion expand on their way to the outlet $K^3$, as in the case of the oven. At the outlet $K^3$ (made smaller than the inlet) there is located any preferred form of ejector, such, for instance, as the cap $K^4$ and deflector-plate $K^5$. This kettle with its jacket is mounted and arranged upon the stove in accordance with the same principles as in the case of the oven, and the operation of the complete structure with the kettle in place is the same as with the oven.

The stove partially shown in Figs. 7 and 8 is intended to operate upon the same principles as in the other figures—that is, to be provided with means for producing a continuous upward flow of air through the burner-cones, either by the application of an ejector at the discharge, or an injector at the inlet, or both combined.

In previous applications for patents filed August 8, 1879, and February 14, 1880, (the former case patented April 13, 1880,) I have pointed out constructions wherein the feed-air for the support of combustion in an oil-stove is conducted from a point above the flame down to and through the burner-plates, and wherein the air-currents are controlled in direction by ejecting and injecting surfaces, to which principles I make no claim herein.

In the present instance it will be observed that the feed-air conduit is made annular and surrounds the chimney, and that the injector-surfaces are combined therewith in such manner that the impinging air-currents, no matter from what point or direction they may come, will be controlled and directed, enabling me by this construction to preserve the symmetric appearance of the stove, to more perfectly prevent the injurious action of disturbing currents, to make the air-conduit more simple and cheap, and to produce a more thoroughly efficient stove, combining greater durability and greater ease of care and manipulation.

The stoves constructed substantially in accordance with the above description are found in practice to admirably answer the several purposes and objects of the invention as herein stated.

The same general principles of construction may be applied to stoves of large or small size, and to stoves of square or oblong patterns, as well as to those of cylindrical or other forms. When made smaller and intended to be carried about from place to place, a catch of any suitable form may be placed opposite the hinge, serving to lock the swinging parts to the base, and a handle or bail applied, as convenience may indicate.

The type of stove herein described is admirably adapted for outdoor use, or in the form of camp-stove.

In a subsequent application for patent, No. 8,083, is shown a cylindrical stove having an injector and ejector properly applied and otherwise constructed and arranged, substantially as herein set forth and applied, in connection with the burners and fittings of a gas apparatus. The features set forth in the said subsequent application as an improvement upon those herein shown, described, and claimed, are, of course, not specifically claimed herein, though subordinate to the present invention.

Having now fully described my invention, what I claim as new, and desire to secure by Letters Patent, is—

1. In a stove of the character herein set forth, the combination of a chimney surrounding the burner or burners, an annular air-conducting channel surrounding said chimney, the same being made broad in proportion to its length and communicating with a passage leading to the under side of the burner-plates, and adapted to conduct the feed-air downwardly, as explained, the chimney being provided with an ejecting device located outside and around it, and the annular air-conduit being provided with an injecting device for turning air-currents down into it, substantially as and for the purposes explained.

2. In a stove of the character herein set forth, the combination, with the draft-chimney, of an exterior surrounding jacket, forming, with said chimney, an enlarged annular fresh-air conduit, broad in proportion to its length, said conduit communicating with the passage leading to the under side of the slotted deflecting burner-plates, said jacket or annular feed-air conduit being provided with a ring having inclined surfaces adapted to direct vertically-moving impinging air-currents down into the conduit, substantially in the manner and for the purposes set forth.

3. The combination of the draft-chimney, the surrounding annular rim for supporting the cooking utensils, the air-injecting device, the jacket surrounding the draft-chimney and forming therewith the enlarged air-feeding conduit, and the slotted burner-plate, all united by the coupling-rods, substantially as set forth.

4. In combination with the draft-chimney and its surrounding jacket, forming therewith the enlarged air-feeding conduit, the vertical radial pot-supports uniting the top rim of the jacket and the rim of the chimney, substantially as shown and described.

5. The combination of the draft-chimney, a surrounding jacket forming, with such chimney, an annular air-conducting channel, which is broad in proportion to its length, as explained, a slotted burner-plate, and a slotted bottom plate for the air-passage leading to the burners, these several parts being mounted above the oil-pot, and arranged substantially as shown and described.

6. In a stove wherein the air for the support of combustion is conducted downwardly and to the under side of the slotted burner-plate through an enlarged fresh-air conduit, broad in proportion to its length, formed by the chimney and its surrounding jacket, the bottom plate of the fresh-air channel supported above the top of the fount and leaving a free open space for the passage of air across said fount, substantially as and for the purposes set forth.

7. In combination with the oil-fount, the standards projecting thereabove, the bottom plate of the enlarged feed-air channel supported on said standards, and the deflecting burner-plate perforated to admit air from the fresh-air conduit and supporting the chimney and its surrounding jacket, substantially as shown.

8. In a stove of the character herein specified, the combination of an air-conduit communicating with the under side of the slotted burner-plate, and provided with an air-injecting device, a chamber located over the chimney, forming a prolongation of the conduit for the products of combustion, said chamber being provided with an ejecting device arranged in connection with its outlet, substantially as shown and described.

9. In a stove of the character herein specified, the combination of an air-conduit communicating with the under side of the slotted burner-plate, and provided with an atmospheric injector, a chamber located over the chimney, inclosing a kettle, forming a prolongation of the conduit for the products of combustion, and provided with an ejector arranged in connection with the outlet from the chamber, substantially as shown and described.

In testimony that I claim the foregoing I have hereunto set my hand in the presence of two witnesses.

J. H. IRWIN.

Witnesses:
 WORTH OSGOOD,
 ARTHUR M. PIERCE.